March 27, 1951  J. P. NARDI  2,546,516

FISH LURE

Filed April 21, 1948

INVENTOR:
Joseph P. Nardi,
BY Louis Chayka
ATTORNEY.

Patented Mar. 27, 1951

2,546,516

UNITED STATES PATENT OFFICE 2,546,516

FISH LURE

Joseph P. Nardi, Detroit, Mich.

Application April 21, 1948, Serial No. 22,481

3 Claims. (Cl. 43—42.06)

My invention pertains to fish lures of the type which, when drawn through water at the end of a fish line, will emit a series of air bubbles, this as a means of attraction for fish. More specifically, my invention pertains to a fish lure having a hollow body substantially simulating the body of a fish, the body having suitable openings by means of which a volume of water may enter the interior of said body to expel air therefrom without, however, filling it entirely so as to deprive the lure of its buoyancy.

A more specific object of my invention is to provide a lure having the above-named qualities (namely, the ability to emit air bubbles and to retain its buoyancy while drawn through water) and one which is featured by simplicity of structure and may, therefore, be made easily and economically.

I shall now describe my lure with reference to the accompanying drawings in which.

Similar numerals refer to similar parts throughout the several views.

Figure 2:
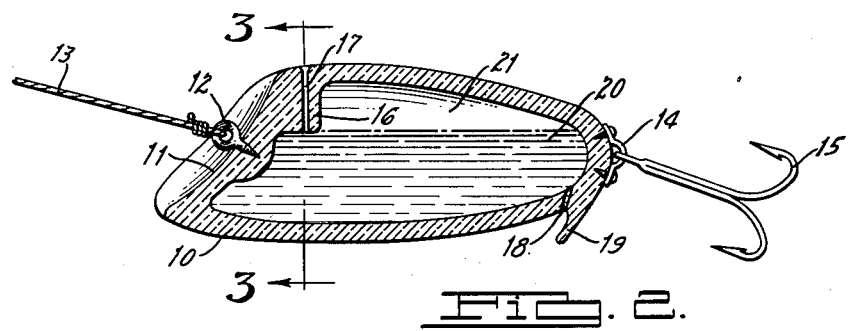
Figure 2 is a longitudinal, sectional view thereof.

The body of the lure, indicated by numeral 10, may be made of any suitable material, preferably a plastic. The shape of the body 10 is oblong and streamlined, to simulate the appearance of the body of a fish, the front of the lure slanting forwardly as shown at 11 and being slightly concave in the center where a screw eye 12 is secured to said face 11 for attachment of a fish line 13. A cluster of fish hooks 15 of the conventional form is attached to the body of the lure by means of an eye-forming bracket 14. Internally, the wall of the body forms a shoulder 16 disposed transversely to the longitudinal axis of the lure, and reaching downwardly substantially to the level of said axis, said shoulder being provided with a vertical vent 17. At its rear end, the lure is provided with a port 18 of restricted diameter, and a scoop 19, this being made in the form of a fin turned forwardly under the inlet into said port 18. Numeral 20 in Figure 2 indicates water which may enter the body of the lure through said port 18.

Figure 4:
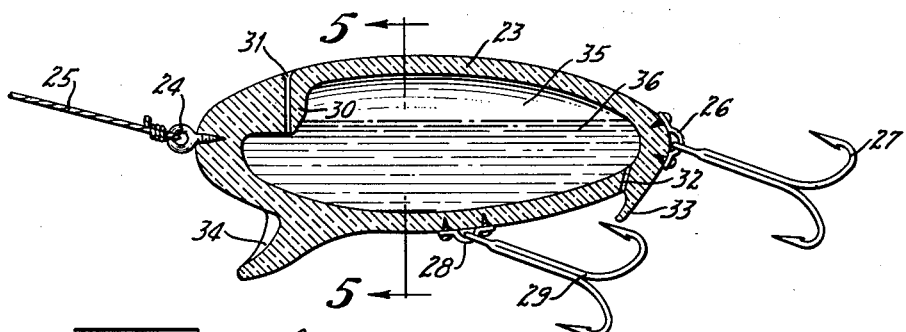
Figure 4 is a longitudinal, sectional view of a modified species of my lure.

A somewhat modified species of my invention is shown in Figure 4. In this case, the body 23 has an elliptical form, the lure being provided with an eye screw 24 at the front end thereof for attachment of a fish line 25. Two clusters of hooks, 27 and 29, are attached to the body by means of eye-forming brackets 26 and 28, one being at the rear of said lure, the other being attached to the underside of the body. Here again, the wall of the body of the lure forms, at the front end thereof, a vertical shoulder 30 which is provided with a vent 31. At the opposite end, that is, at the rear end of the lure, in the lower wall thereof, the lure is provided with a port 32. A scoop 33, made in the same shape as scoop 19 in Figure 2 and being integrally connected to the body of the lure, extends forwardly, serving to divert a flow of water into the body of the lure under the inlet into said port 32. At the front end, the body of the lure is provided with a spoon-like fin 34, the main purpose of this being to keep the lure submerged when drawn through water by line 25.

Figure 1:
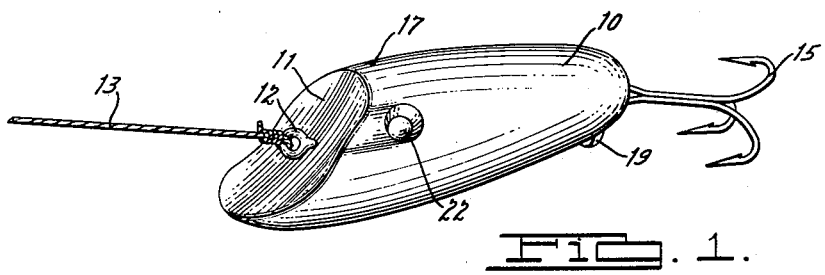
Figure 1 is a perspective view of my lure.

To conclude my description, I wish to add that numeral 22 in Figure 1 indicates a simulated eye, this being more or less of an ornamental nature.

I shall now describe the operation of my lure. It will be understood that the lure, which has two small openings in its body as described above, will normally contain a quantity of air in the interior cavity thereof. This air, when the lure is drawn through water by means of a line 13, will be slowly and gradually expelled by water which will enter the interior portion of said lure by port 18. As the level of the water therein rises, the air will be forced out from the lure through vent 17.

Figure 3:
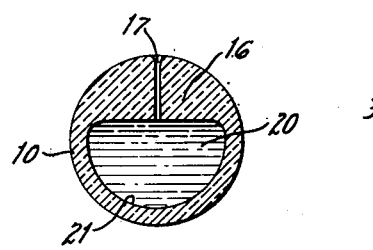
Figure 3 is a transverse, sectional view taken on line 3—3 of Figure 2.
Figure 5:
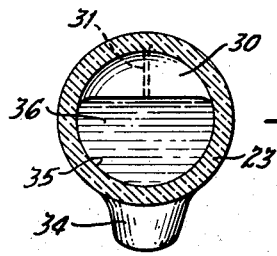
Figure 5 is a transverse, sectional view of the lure shown in Figure 4, on line 5—5 of said Figure 4.

This will continue till the surface of water within the body of the lure will reach a level above that of the lower end of vent 17 or 31, respectively, as best shown in Figure 3, where the surface of water 36 is above the lower end of vent 31. The air above the surface of the water will be trapped within the space defined by the top level of water contents within the body of the lure and the upper wall of said body. Thereafter, no air will escape from the lure, but the air volume will be sufficient to supply enough buoyancy to the lure to prevent it from sinking.

It will be obvious that some changes may be made in the construction of my lure, also in the position of the vent leading downwardly into the interior of the lure's body, without departing from the inventive principle disclosed herein. Obviously, also, small changes in the shape of the lure—the application of means to impart to the lure an oscillating movement, the application of hooks—are all features of lesser importance and may be changed as desired without affecting the operation of my lure.

What I, therefore, wish to claim is as follows:

1. A fish lure of the kind described, comprising a shell-like, hollow body, the body including an integrally formed shoulder extending downwardly from the top portion thereof to a level somewhat above the longitudinal axis of the lure, said shoulder being provided with a vertical vent leading to the top surface of the body, said body having a port in the underside part of the body serving for admission of water thereto up to and somewhat above the level of the lower end of the above-said vent to force air out from within the body through said vent and to catch a volume of air under the top portion of the body to keep the lure buoyant.

2. A fish lure of the kind described, comprising a hollow, fish-like body being made in the form of an all-enclosed shell, the body including on its inner side an integrally formed portion extending downwardly towards the longitudinal axis of the body and provided with a vent leading from the bottom of said integrally formed portion to the top of the body, said body being provided with a port on the underside for admission of water into the body of the lure to a level above the lower end of the vent to force air outwards through said vent, the space between the surface of the water and the top portion of the body serving to entrap a volume of air within said body, to impart buoyancy to said lure.

3. A fish lure of the kind described, comprising an elliptical, shell-like body having a hollow interior, the body including an integrally formed shoulder within the interior part thereof, said shoulder extending downwardly from the top portion of said body and being provided with an upwardly leading vent, said body having an inlet port in its lower portion for retarded admission of water into the interior of said body to force air gradually out from the interior till said water has risen above the level of the lower end of the vent, the space above said level and the top portion of the body, outside the vent-including shoulder, forming a trap for the remaining air to impart buoyancy to the lure.

JOSEPH P. NARDI.

REFERENCES CITED

The following references are of record in the file of this patent:

UNITED STATES PATENTS

| Number | Name | Date |
| --- | --- | --- |
| 489,110 | Welch | Jan. 3, 1893 |
| 1,249,194 | Race | Dec. 4, 1917 |
| 2,445,523 | Goldbach | July 20, 1948 |